United States Patent [19]

Radecki

[11] 4,241,510
[45] Dec. 30, 1980

[54] AID FOR HANGING PICTURES

[76] Inventor: Ronald P. Radecki, 719 E. Jefferson Blvd., South Bend, Ind. 46625

[21] Appl. No.: 80,453

[22] Filed: Oct. 1, 1979

[51] Int. Cl.³ .............................................. G01B 3/02
[52] U.S. Cl. .................................... 33/180 R; 33/189; 33/192; 33/451; 33/474
[58] Field of Search ................ 33/180 R, 189 R, 191, 33/192, 169 C, 433, 430, 474, 476, 479, 494, 451, 477, 174 G

[56] References Cited

U.S. PATENT DOCUMENTS

| 346,371 | 7/1886 | Humphrey | 33/191 |
| 1,221,777 | 4/1917 | Uney | 33/451 |
| 1,373,367 | 3/1921 | Summers | 33/191 |
| 2,118,747 | 5/1938 | Vest | 33/191 |
| 2,816,366 | 12/1957 | Barlow | 33/180 R |
| 3,516,165 | 6/1970 | Pfeffer | 33/180 R |
| 3,530,591 | 9/1970 | Moffitt | 33/180 R |

FOREIGN PATENT DOCUMENTS 706308  3/1954  United Kingdom ..................... 33/451

Primary Examiner—Willis Little
Attorney, Agent, or Firm—Oltsch, Knoblock & Hall

[57] ABSTRACT

A device for aiding in the hanging of a picture or similar wall supported member. The device is of an inverted "T" shape having cross arms and a neck part. Slide members are carried on the cross arms to engage a hanging wire. Locating marks on the neck part indicate the top of the picture and are used to position the device at a desired wall location for the picture with the slide members locating the hangers, such as hooks.

3 Claims, 4 Drawing Figures

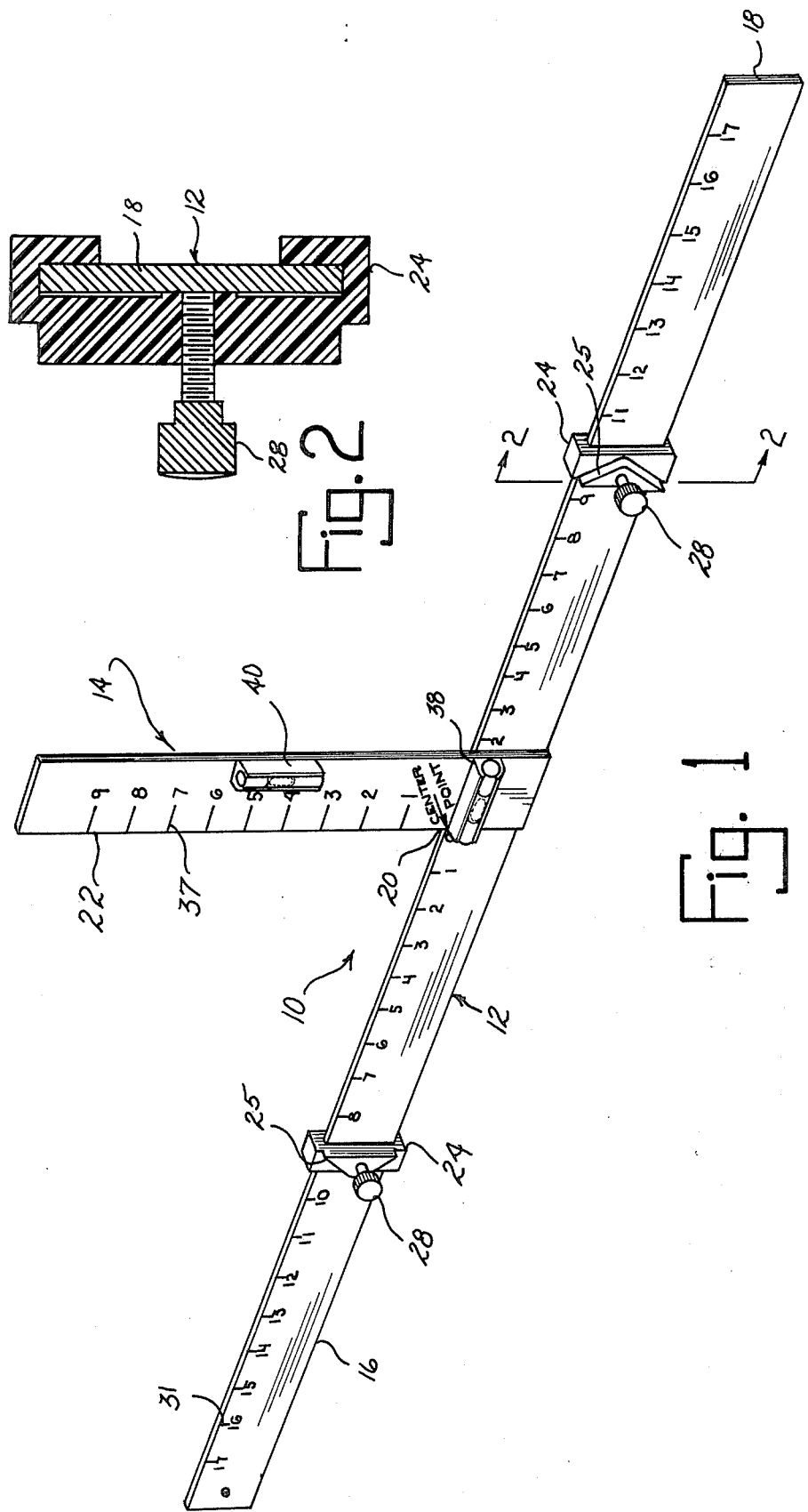

AID FOR HANGING PICTURES

SUMMARY OF THE INVENTION

This invention relates to a device to aid in hanging pictures or similar wall supported members.

Previously, locating the proper position for picture hangers such as hooks to insure a level picture at a precise desired location proved to be a difficult and frustrating task, aided only by a ruler or yardstick.

The present invention serves to simplify the procedure for hanging pictures and is an inverted T-shaped device having a base of oppositely extending, aligned arms and a neck perpendicular to the base. Each arm carries a slide member upon which the hanging wire can be fitted. The slide members, which serve as hanger locators, are moved along the arms to predetermined points so that the hanging wire will not extend above the top of the frame when the picture is hung. The neck of the hanging aid is used to mark the top of the picture, thereby facilitating the determination of the position of the slide members. The hanging aid also carries a level to facilitate the proper orientation of the picture in relation to the room.

Accordingly, it is an object of this invention to provide a means to aid in the hanging of a picture or similar wall supported member.

Another object of this invention is to provide a device for determining the position of two hangers for a picture or similar wall supported member.

Still another object of this invention is to provide means for leveling a picture.

Other objects will become obvious upon a reading of the following description.

BRIEF DESCRIPTION OF THE DRAWINGS

FIG. 1 is a perspective view of the picture hanging aid.

FIG. 2 is a cross sectional view of a slide member as seen from line 2—2 of FIG. 1.

DESCRIPTION OF THE PREFERRED EMBODIMENT

Figure 3:
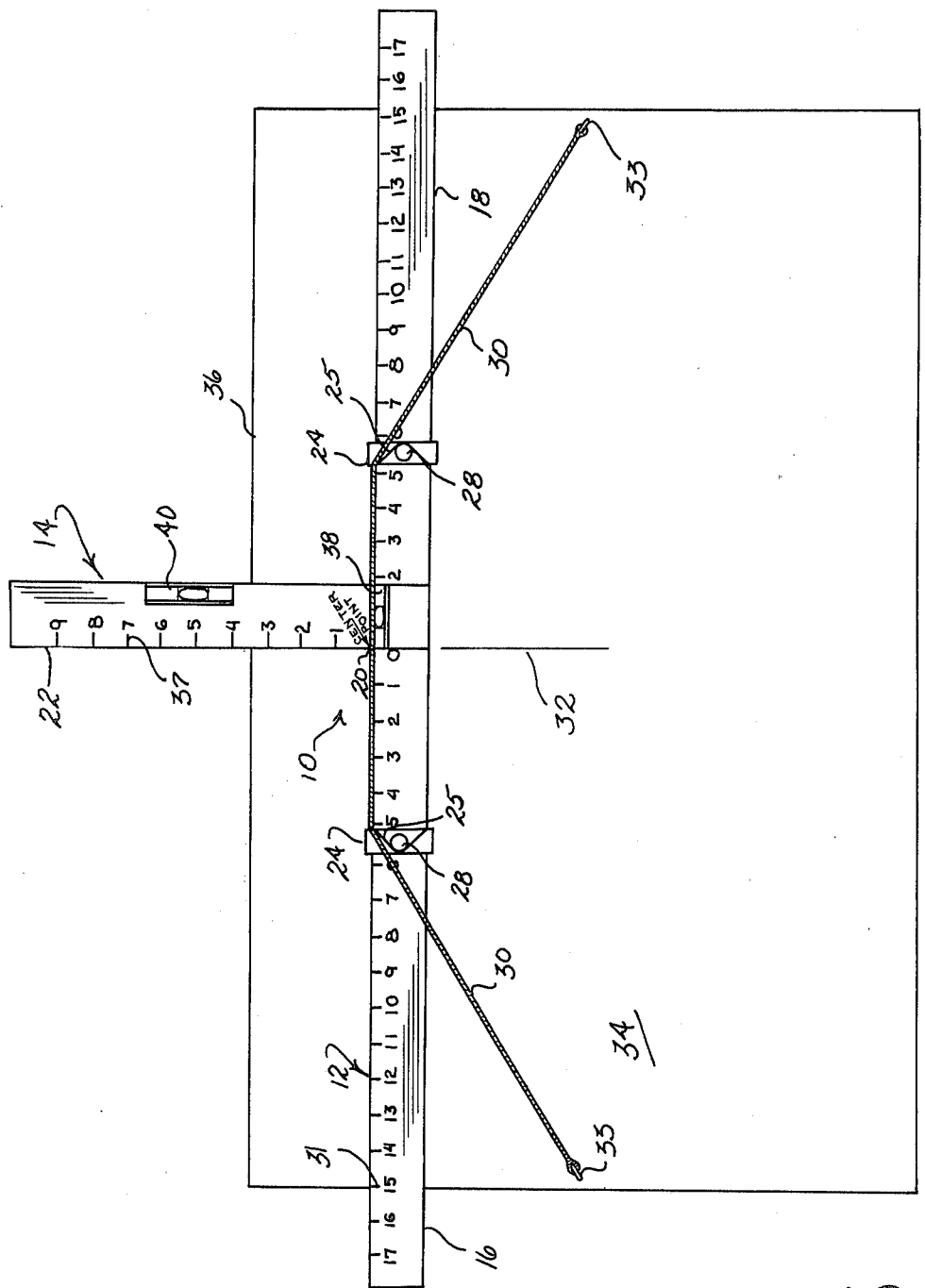
FIG. 3 is a view showing the picture hanging aid being used to determine the top location of a picture.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Picture hanging aid 10, as shown in FIG. 1, has a base part 12 and a neck part 14. Base part 12 has a first arm 16 and a second arm 18 extending in opposite directions along the same longitudinal axis from a center point 20. Neck part 14 extends perpendicularly from base part 12 and includes a leading edge 22 lying on the center point 20 of the base part.

Two slide members 24 are carried by base part 12, one by each arm 16, 18. Each slide member 24 is shiftable along its supporting arm 16, 18 and includes a securing screw 28. When a slide member 24 is placed in a desired position, its screw 28 can be tightened against the underlying arm of base part 12 to secure the slide member to the arm.

Figure 4:
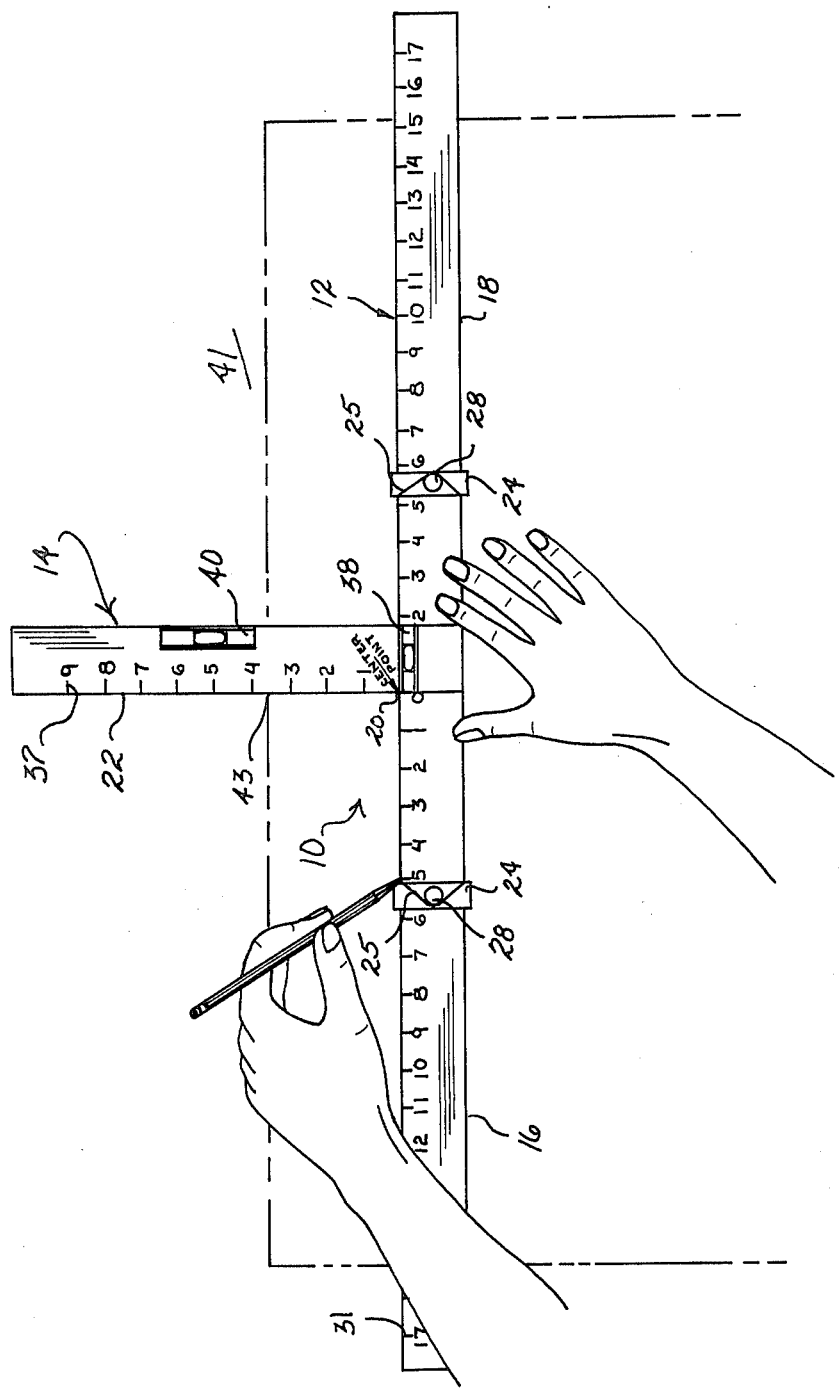
FIG. 4 is a perspective view showing the picture hanging aid being used to mark the placement of hangers upon a wall.

FIGS. 3 and 4 illustrate how the handing aid 10 is used. The slide members 24 are set at a predetermined position equal distance from center point 20 along base part 12 and screws 28 are tightened. Normally it is desirable to position slide members 24 at intervals of one-third the width of the picture. In FIG. 3, picture 34 is 30 inches wide as indicated by scaled indicia 31 along base part 12 with slide members 24 being spaced about 10 inches apart. Hanging wire 30 secured between eyelets 33 of picture 34 is stretched taut over slide members 24 and leading edge 22 of neck 14 is placed along the midline 32 of the picture at its top 36. The location of top 36 of picture 34 is noted on neck part 14 which includes scaled indicia 37. Each slide member 24 includes a tapered guide surface 25 to accommodate contact with the picture hanging wire. Picture 34 is then removed from hanging aid 10 and the aid is placed against a wall 41 to determine the placement of the picture supporting hangers, such as hooks. The location on neck part 14 which denotes the top center of picture 34 is placed at a mark or location 43 on wall 41 designating the desired top center height of the picture, shown in phantom lines in FIG. 4. The hanging aid has a leveling device 38 located on base part 12 to enable the user to be certain that the base part is level. After base part 12 is leveled with the picture top location upon neck part 14 being positioned at the desired top center height of the picture on the wall, marks are made at the top tip of surface 25 of each slide member 24 as shown in FIG. 4 to designate the bottom of the picture hooks. The picture hooks are then secured to the wall and the picture hung.

The use of hanging aid 10 is not limited to the hanging of pictures or similar framed members. The perpendicular arrangement of the neck part 14 and base part 12 allow the aid 10 to be used as a T-square. Neck part 14 also carries a level 40 which enables the aid 10 to be used to check the orientation of vertical uprights.

It is understood that the invention above described is not to be limited to the details above given but may be modified within the scope of the appended claims.

What I claim is:

1. A device for determining the location of two hangers for a picture or similar type wall supported member, said device comprising a base part and a perpendicular neck part, said base part being defined by oppositely located first and second arms, said base part having indicia thereon, said indicia extending from a center point outwardly along said first and second arms, said neck part having a lateral edge, said neck part having indicia along said lateral edge thereof, said neck part lateral edge being aligned with said base at said center point, a pair of slide members, one of said slide members carried by each arm and being shiftable along its supporting arm toward and away from said center point, each slide member including securing means for positioning the slide member at a predetermined location along its supporting arm, said base part indicia for determining the distance of each slide member from said center point, said slide members including guide means located in alignment with said center point for engaging the hanging wire of said wall supported member when equally spaced from said center point along said arms whereby said wire when drawn taut between said slide members will pass through said center point with said neck part extending at least to the top of said wall supported member, said neck part indicia constituting locating means for indicating the location of said wall supported member top and said guide means constituting location points for said hangers when said base and neck parts are positioned against a wall.

2. The device of claim 1 and including a level means for leveling the location of each guide means on said base part when said neck part is at said desired top height against said wall.

3. The device of claim 2 and including a second level means, said second level means lying along an axis perpendicular to said first mentioned level means.

* * * * *